United States Patent [19]

Theurer et al.

[11] Patent Number: 5,199,176
[45] Date of Patent: Apr. 6, 1993

[54] APPARATUS FOR THE NON-CONTACT MEASUREMENT OF A TRACK GAGE

[75] Inventors: Josef Theurer, Vienna; Franz Eglseer, Ohlsdorf, both of Austria

[73] Assignee: Franz Plasser Bahnbaumaschinen-Industriegesellschaft m.b.H., Vienna, Austria

[21] Appl. No.: 781,774

[22] Filed: Oct. 23, 1991

[30] Foreign Application Priority Data

Nov. 12, 1990 [AT] Austria .................... 2277/90

[51] Int. Cl.$^5$ .................... G01C 3/00; E01B 35/04; E01B 29/04; B61K 9/00
[52] U.S. Cl. .................... 33/338; 33/287; 33/1 Q; 33/523.1; 33/651.1
[58] Field of Search .............. 33/338, 1 Q, 287, 523.1, 33/651, 651.1

[56] References Cited

U.S. PATENT DOCUMENTS

| | | | |
|---|---|---|---|
| 3,828,440 | 8/1974 | Plasser et al. | 33/287 |
| 3,864,039 | 2/1975 | Wilmarth | 33/287 |
| 4,181,430 | 1/1980 | Shirota et al. | 33/287 |
| 4,490,038 | 12/1984 | Theurer et al. | 33/338 |
| 4,658,730 | 4/1987 | Von Beckmann et al. | 33/287 |
| 5,090,329 | 2/1992 | Theurer | 33/287 |

FOREIGN PATENT DOCUMENTS 321346 3/1975 Austria .
328489 3/1976 Austria .
344773 12/1977 Austria .

Primary Examiner—William A. Cuchlinski, Jr.
Assistant Examiner—Christopher W. Fulton
Attorney, Agent, or Firm—Collard & Roe, P.C.

[57] ABSTRACT

Apparatus for the non-contact measurement of the gage of a track comprises a machine frame equipped with undercarriages supporting the machine frame for mobility on the track and a wheel axle having wheels running on the track rails, and an optical sensor associated with each track rail and affixed to the wheel axle. Each sensor is mounted on the wheel axle and pivotal about an axis extending in the longitudinal direction of the machine frame, and each sensor emits a light beam capable of sensing the distance of the sensor from the associated rail without contact therewith. A stepping motor is connected to each sensor for pivoting the sensor about this axis, the stepping motor and connected sensor constituting a closed control circuit for calculating an angular position required for focussing the light beam on a location of the associated track rail having a constant vertical position and correspondingly pivoting the sensor with respect to the associated track rail into the calculated angular position.

10 Claims, 1 Drawing Sheet

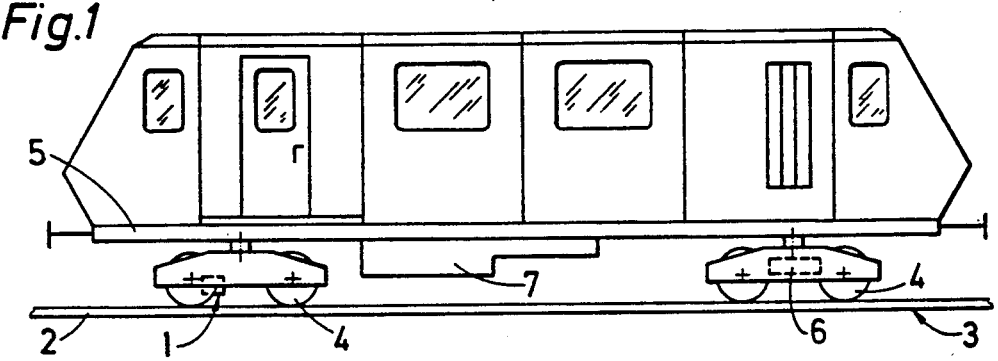
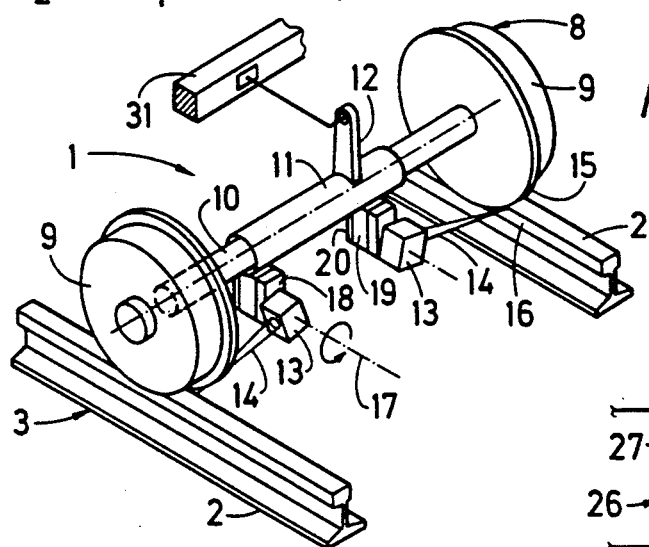
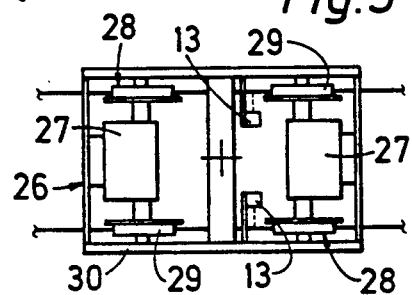
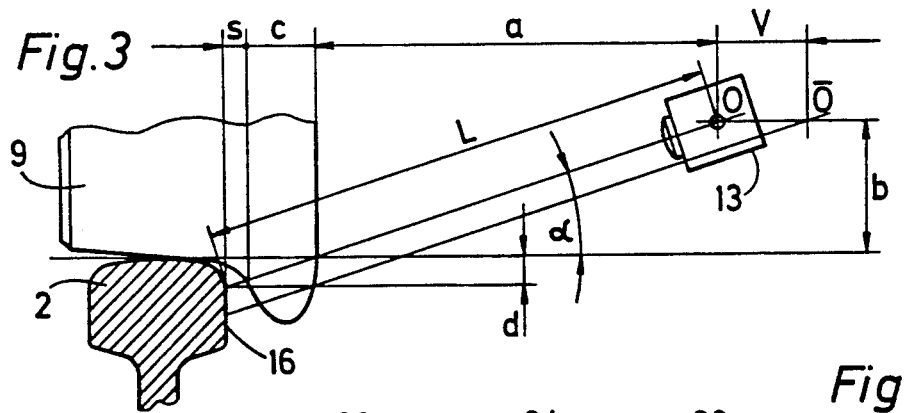
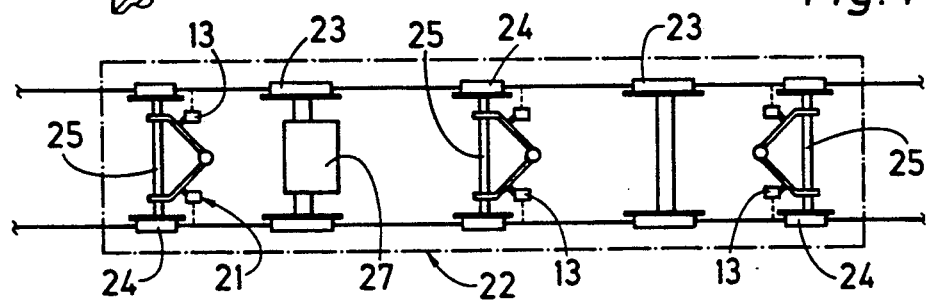

APPARATUS FOR THE NON-CONTACT MEASUREMENT OF A TRACK GAGE

BACKGROUND OF THE INVENTION

1. Field of the Invention

The present invention relates to an apparatus for the non-contact measurement of the gage of a track comprising two rails having rail heads, which comprises a machine frame equipped with undercarriages supporting the machine frame for mobility on the track and a wheel axle having wheels running on the track rails, and an optical sensor associated with each track rail and affixed to the wheel axle.

2. Description of the Prior Art

U.S. Pat. No. 4,490,038 discloses an apparatus for the non-contact determination of the lateral position of a railroad track with respect to an adjacent track. It uses a distance measuring device comprised of a laser beam emitter and receiver with coincident optical axes for emitting and receiving the laser beam, the axes extending in a transverse plane perpendicular to the track and the axis being pivotal in this plane by a drive. A limit switch is associated with, and actuated by, the measuring device to limit the range of the pivoting movement. As soon as the optical axis is pivoted above the rail head of the adjacent track, the distance measuring value changes abruptly. This sudden jump in the measuring value causes the last measured distance value to be stored and indicated when this sudden jump exceeds a selected mimimum value. At the same time the drive is reversed so that the optical axis is pivoted back towards the foot of the rail until the measured distance value jump is eliminated. In this way, the optical axis of the measuring device constantly senses the range of the rail between the rail web and the upper edge of the rail head. The minimal distance to the rail head is indicated and used for the determination of the lateral position. This apparatus cannot be used to measure the track gage or the camber.

Austrian patent No. 344,773 discloses an apparatus for the optical measurement of a lateral deviation of a rail from the desired line. For this purpose, a receiver and a projector are spaced from each other above each rail. The emitted light is reflected from the inside of the rail head. The two receivers and projectors are arranged on a measuring frame which is supported directly on the bearing boxes of a swivel truck. This apparatus is structurally complex and requires a special structure of the undercarriage.

Austrian patents Nos. 321,346 and 328,489 and U.S. Pat. No. 3,864,039 exemplify other optical track gage measuring apparatus but in none of them is the sensor pivotal by a stepping motor about an axis extending in the longitudinal direction of the machine frame.

SUMMARY OF THE INVENTION

It is the primary object of this invention to simplify the construction of an apparatus of the first-described type wherein the sensor is affixed to a wheel axle.

The above and other objects are accomplished with an apparatus for the non-contact measurement of the gage of a track comprising two rails having rail heads, which comprises a machine frame extending in a longitudinal direction and equipped with undercarriages supporting the machine frame for mobility on the track and a wheel axle having wheels running on the track rails, an optical sensor associated with each track rail and affixed to the wheel axle, each sensor being mounted on the wheel axle and pivotal about an axis extending in the longitudinal direction of the machine frame, and each sensor emitting a light beam capable of sensing the distance of the sensor from the associated rail without contact therewith, and a stepping motor connected to each sensor for pivoting the sensor about this axis, the stepping motor and connected sensor constituting a closed control circuit for calculating an angular position required for focussing the light beam on a location of the associated track rail having a constant vertical position and correspondingly pivoting the sensor with respect to the associated track rail into the calculated angular position.

Such an apparatus with a measuring light beam directly oriented towards the rail head requires only a few structural parts and may, therefore, be so miniaturized that it may be retrofitted into any type of undercarriage without any change in its structure. Since a minimal number of structural components are required for the apparatus, it has a simple construction which can withstand even robust stresses. In addition, this miniaturized structure makes it possible to mount the measuring system so that the measuring point on the rail head is very close to the point of contact of the wheel of the associated undercarriage with the rail. This produces optimal measuring conditions. The measuring system operates so rapidly that accurate and repeated measuring results may be obtained at speeds up to 300 km/h. The closed control circuit assures pivotal movements of the sensors automatically so that the sensed point on the rail head is always at the same desired location, for example 14 mm below the running surface of the rail head. Any transverse displacement of the apparatus between the two rails, due to the clearance between the flanged wheels and the rail heads caused by the track gage, is automatically taken into account, which assures exact measuring results.

According to a preferred feature, the apparatus further comprises a tube mounted on the wheel axle between the wheels and rotatable on the wheel axle, the sensors being affixed to the rotatable tube, and a support element counteracting a rotary moment applied to the tube, the support element connecting the tube to a fixed structure, such as a frame of the undercarriage comprising the wheel axle. At least one of the undercarriages has a frame bearing the wheel axle and the support element connects the tube to the frame. This has the advantage that no compensation of the vertical movement between the undercarriage and the car body supported thereon is required. Furthermore, this enables the apparatus to be retrofitted on existing swivel trucks without changing their structure. Such a direct mounting of the measuring apparatus on the wheel axle of an undercarriage is possible only because the apparatus is miniaturized and so simple that it can withstand the high stresses exerted upon the undercarriage. If the wheels are flanged wheels whose flanges engage the rail heads, and the location of the associated track rail is on the rail head immediately adjacent the flanged wheel engaging the rail head of the associated track rail, optimal measuring conditions giving the most accurate measurements are obtained.

If the apparatus further comprises a reduction gear connecting the stepping motor to the sensor, the calculated pivoting angle of the sensor about the longitudinal axis may be accurately transmitted by the stepping motor to the sensor.

With an apparatus wherein three undercarriages each comprising the wheel axle having an optical sensor associated with each track rail affixed thereto are spaced from each other in the longitudinal direction of the machine frame, it is possible to measure not only the track gage but also the camber, the two outer measuring systems producing a reference basis with respect to which the intermediate measuring system measures the camber or the height of the arc of the track.

The apparatus may further comprise axle bearings for the wheels and a frame carried by the axle bearings, the sensors being affixed to the frame. In this way, the apparatus may be mounted on a swivel truck even if there is not enough space on the wheel axle between the wheels, the direct mounting of the frame on the axle bearings excluding any falsification of the measuring results due to the resilient mounting of the car body on the undercarriage.

In another preferred embodiment, each sensor is comprised of a structural unit including a source of the emitted light beam, preferably a laser beam, a photo-detector for sensing the light beam reflected from the location on the associated track rail, and optical lens systems arranged to transmit the emitted light beam from the source to the location and to transmit the reflected light beam from the location to the photo-detector. Such a robust structural unit is substantially insensitive to changes in the ambient temperature, ambient light conditions and the surface properties of the measured object.

BRIEF DESCRIPTION OF THE DRAWING

The above and other objects, advantages and features of the invention will become more apparent from the following detailed description of certain now preferred embodiments thereof, taken in conjunction with the accompanying, somewhat schematic drawing wherein FIG. 1 is a simplified side elevation of a measuring car whose machine frame is supported on two swivel trucks on at least one of which is arranged a measuring apparatus according to the present invention;

FIG. 2 is an enlarged schematic perspective view of a wheel axle of the swivel truck on which the apparatus is mounted;

FIG. 3 diagrammatically illustrates the non-contact measuring operation of the apparatus;

FIG. 4 is a top view showing an embodiment with three undercarriages spaced from each other along the track and each carrying a measuring apparatus; and FIG. 5 schematically shows another embodiment of the mounting of the sensors on a frame supported on the axle bearings.

DETAILED DESCRIPTION OF PREFERRED EMBODIMENTS

FIG. 1 shows a measuring car carrying apparatus 1 for the non-contact measurement of the gage of track 3 comprising two rails 2, 2 having rail heads, which comprises machine frame 5 extending in a longitudinal direction and equipped with undercarriages 4 supporting the machine frame for mobility on the track. The machine frame is propelled along the track by drive 6 which is powered by motor 7.

As shown in FIG. 2, axle 8 of one undercarriage 4 is comprised of wheel axle 10 having flanged wheels 9 running on track rails 2, 2. An optical sensor 13 is associated with each track rail 2 and is affixed to wheel axle 10, each sensor 13 being mounted on the wheel axle and pivotal about axis 17 extending in the longitudinal direction of machine frame 5. Each sensor 13 emits a light beam 14 capable of sensing the distance of sensor 13 from associated rail 2 without contact therewith. A stepping motor 19 is connected to each sensor 13 for pivoting the sensor about axis 17, and the stepping motor and connected sensor constitute a closed control circuit for calculating an angular position required for focussing the light beam on location 16 of the associated track rail having a constant vertical position and correspondingly pivoting the sensor with respect to the associated track rail into the calculated angular position, this location being shown in FIG. 3 on inside 16 of the rail head.

In the embodiment shown in FIG. 2, apparatus 1 further comprises tube 11 mounted on wheel axle 10 between wheels 9, 9 and rotatable on the wheel axle, the sensors being affixed to the rotatable tube. Support element 12, which counteracts a rotary moment applied to the tube, the support element connecting the tube to a fixed structure, such as frame 31 of undercarriage 4 which comprises the wheel axle. This support element holds tube 11 against rotation on wheel axle 10 when the undercarriage with its wheel axle is subjected to vertical or horizontal movements. A respective sensor 13 is mounted on each end of tube 11 so that emitted light beams 14 impinge on inside 16 of the rail heads next to flanges 15 of wheels 9. The pivoting of sensors 13 about axis 17 enables the emitted light beams 14 to impinge on inside rail head surface 16 at a constant distance from the running surface of the rail head (SOK) immediately adjacent the flanged wheel engaging the rail head of the associated track rail. This also takes into account any transverse displacement of wheel axle 10 due to a clearance between flanges 15 of wheels 9 and the rails, which is a result of the track gage being slightly wider than the distance between the wheel flanges.

In the illustrated embodiment, the apparatus further comprises a reduction gear 18 connecting stepping motor 19 to sensor 13, the motor being mounted on carrier plate 20 affixed to tube 11. Each illustrated sensor 13 is comprised of a structural unit including a source of the emitted light beam, preferably a laser beam, a photo-detector for sensing the light beam reflected from location 16 on the associated track rail, and optical lens systems arranged to transmit the emitted light beam from the source to the location and to transmit the reflected light beam from the location to the photo-detector. The photo-detector is sensitive to rays in the visible and near-infrared range and accurately determines the center of each impinging light beam 14 and generates a signal proportional to the position of the impinged point. Any approach of sensor 13 towards, and distancing from, the rail head causes a displacement of the imaged point on the photo-detector. This makes it possible accurately to monitor the position of the measured object on the basis of the known signals received from the photo-detector.

FIG. 3 schematically illustrates the measuring operation, which will be explained in connection with the algorithm for continuously calculating the pivoting angle of sensor 13 required to focus beam 14 on gage side surface 16 of the rail head at a predetermined distance from the running face of the rail (SOK), independently of the running of wheels 9 and the track gage.

This algorithm has the further purpose of continuously calculating the horizontal distance between sensor 13 and the location marked by the reflected point of light on gage side surface 16 of the rail head, for example 14 mm below SOK. As the following formulae show, this algorithm requires a single, non-recurrent calibration of the measuring system before the system is put in operation.

In FIG. 3, 0 is the center of rotation or the fulcrum of sensor 13 about which the sensor is pivoted at the time of calibration. $\bar{0}$ designates the same fulcrum after wheel axle 10 has been transversely displaced as a result of the clearance s between wheel flanges 15 and gage side surface 16 of the rail heads, i.e. due to the track gage slightly exceeding the distance between the wheel flanges, which is comparable to a displacement of the rail due to a widening of the track gage.

Distances a, b and d are constants of the system.

Thickness c of wheel flange 15 is measured before the calibration and serves as input parameter for calculating the calibrating values $\alpha kal$ for the pivoting angle and $Lkal$ for the distance. These two calibrating values are calculated on the basis of the following formulae:

$$Lkal = \sqrt{(b + d)^2 + (a + c + s)^2}$$

$$\alpha kal = \arcsin\left(\frac{b + d}{Lkal}\right)$$

The required pivoting of sensor 13 is calculated on the basis of the following formula if $L \neq Lkal$:

$$\alpha = \arcsin\left(\frac{b + d}{L}\right)$$

Pivoting angle $\beta = \alpha kal - \alpha$, positive values for $\beta$ indicating a pivoting movement in a clockwise direction and $\beta$ always being related to calibrated initial angle $\alpha kal$.

Displacement V resulting from an increased clearance s, i.e. a widening of the track gage, causing a transverse displacement of wheel axle 10, is accordingly calculated on the basis of the following formula:

$$V = \frac{2 \cdot (L - Lkal)}{\cos\alpha kal + \cos\alpha}$$

The above calculations and the resultant continuous control of the pivoting movement of sensor 13 must be made continuously and in the following sequence within a repeating loop:

(1) Distance measuring signal L is sensed,
(2) Pivoting angle $\beta$ is calculated,
(3) Sensor 13 is adjusted to the position determined by pivoting angle $\beta$,
(4) Distance measuring signal L is sensed,
(5) Displacement V is calculated and is put out by the sensor as the measured value, i.e. the distance of the rail from the associated sensor, and
(6) Return to step (2).

Pivoting of sensor 13 about axis 17 is effected by stepping motor 19 through reduction gear 18, the operation of the motor being controlled by the control signal generated by the sensor on the basis of calculated pivoting angle $\beta$.

The adjustment of the motor to calibrating angle value $\alpha kal$ at the time of calibration is effected by setting the number of steps corresponding to this angle.

The above algorithm enables the measuring system to make accurate measurements with respect to new rails as well as old rails whose gage side surfaces may be somewhat worn.

FIG. 4 illustrates an embodiment wherein a measuring car 22 has a machine frame supported on undercarriages 23 and is propelled by drive 27, and incorporates three additional undercarriages 24 linked to the machine frame and each comprising a wheel axle 25 to which sensors 13 are affixed to constitute measuring apparatus 21. The additional undercarriages are spaced from each other in the longitudinal direction of the machine frame so that this measuring car may be used not only to measure the track gage but also the height of the arc of the track. Each measuring apparatus 21 is of the structure described in connection with FIG. 2 or 5 and operates in the same manner.

To measure the height of the arc of a track, particularly in a track curve, sensors 13 on center undercarriage 24 continuously measure the heights of the arc based on a reference basis constituted by the outer sensors in the curve. To obtain exact measuring values, undercarriages 24 are pressed against one of the rails to prevent their transverse displacement. At the same time, the sensors also measure the track gage.

FIG. 5 diagrammatically illustrates another embodiment of mounting the described apparatus on an undercarriage illustrated as swivel truck 26 having two wheel sets 28 incorporating drives 27. Each wheel set has axle bearings at the field sides of the rails for wheels 29 and frame 30 is carried by the axle bearings. Sensors 13 are affixed to the frame and function in the same manner as hereinabove described.

What is claimed is:

1. Apparatus for the non-contact measurement of the gage of a track comprising two rails having rail heads, which comprises (a) a machine frame extending in a longitudinal direction and equipped with undercarriages supporting the machine frame for mobility on the track and a wheel axle having wheels running on the track rails, (b) an optical sensor associated with each track rail and affixed to the wheel axle, each sensor being mounted on the wheel axle and pivotal about an axis extending in the longitudinal direction of the machine frame, and each sensor emitting a light beam capable of sensing the distance of the sensor from the associated rail without contact therewith, and (c) a stepping motor connected to each sensor for pivoting the sensor about said axis, the stepping motor and connected sensor constituting a closed control circuit for calculating an angular position required for focussing the light beam on a location of the associated track rail having a constant vertical position and correspondingly pivoting the sensor with respect to the associated track rail into the calculated angular position.

2. The apparatus of claim 1, further comprising a tube mounted on the wheel axle between the wheels and rotatable on the wheel axle, the sensors being affixed to the rotatable tube, and a support element counteracting a rotary moment applied to the tube, the support element connecting the tube to a fixed structure.

3. The apparatus of claim 2, further comprising a frame bearing the wheel axle and the support element connects the tube to the frame.

4. The apparatus of claim 3, wherein at least one of the undercarriages comprises the frame and the wheel axle.

5. The apparatus of claim 4, wherein the wheels are flanged wheels whose flanges engage the rail heads, the location of the associated track rail being on the rail head immediately adjacent the flanged wheel engaging the rail head of the associated track rail.

6. The apparatus of claim 1, further comprising a reduction gear connecting the stepping motor to the sensor.

7. The apparatus of claim 1, wherein three of said undercarriages each comprising the wheel axle having an optical sensor associated with each track rail affixed thereto are spaced from each other in the longitudinal direction of the machine frame.

8. The apparatus of claim 1, further comprising axle bearings for the wheels and a frame carried by the axle bearings, the sensors being affixed to the frame.

9. The apparatus of claim 1, wherein each sensor is comprised of a structural unit including a source of the emitted light beam, a photo-detector for sensing the light beam reflected from the location on the associated track rail, and optical lens systems arranged to transmit the emitted light beam from the source to the location and to transmit the reflected light beam from the location to the photo-detector.

10. The apparatus of claim 9, wherein the emitted light beam is a laser beam.

* * * * *